United States Patent
Joyce et al.

(10) Patent No.: US 7,196,639 B2
(45) Date of Patent: Mar. 27, 2007

(54) LOCATION-BASED CONTENT DELIVERY

(75) Inventors: Dennis P. Joyce, Rochester, NY (US); Michael J. Sutter, Piffard, NY (US); Kevin R. Drake, East Henrietta, NY (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/847,604

(22) Filed: May 17, 2004

(65) Prior Publication Data

US 2004/0209602 A1 Oct. 21, 2004

Related U.S. Application Data

(63) Continuation of application No. 09/898,300, filed on Jul. 3, 2001, now Pat. No. 6,798,358.

(51) Int. Cl.
G08G 1/123 (2006.01)
(52) U.S. Cl. .................. 340/995.12; 340/995.24; 455/422.1; 701/208
(58) Field of Classification Search .......... 340/995.12, 340/995.13, 995.24; 701/208, 211, 213; 455/414.2, 414.3, 422.1
See application file for complete search history.

(56) References Cited

U.S. PATENT DOCUMENTS

| | | | |
|---|---|---|---|
| 5,579,535 A | 11/1996 | Orlen et al. ............. 455/33.1 |
| 5,648,768 A | 7/1997 | Bouve .................... 340/988 |
| 5,774,803 A | 6/1998 | Kariya ................... 455/414 |
| 5,999,126 A | 12/1999 | Ito ........................ 342/357.1 |
| 6,014,090 A | 1/2000 | Rosen et al. ............. 340/905 |
| 6,038,508 A * | 3/2000 | Maekawa et al. .......... 701/207 |
| 6,091,956 A | 7/2000 | Hollenberg ............... 455/456 |
| 6,097,313 A | 8/2000 | Takahashi et al. ......... 340/905 |
| 6,138,072 A | 10/2000 | Nagai ..................... 701/207 |
| 6,151,309 A | 11/2000 | Busuioc et al. ........... 370/328 |
| 6,243,030 B1 | 6/2001 | Levine .................... 340/995 |

(Continued)

FOREIGN PATENT DOCUMENTS

DE 19735836 A1 2/1999

(Continued)

OTHER PUBLICATIONS

"Method for Generating Location-Specific Internet Application Content," Research Disclosure, Kenneth Mason Publication, Hampshire, GB, No. 425, p. 1197, XP000889180.

(Continued)

*Primary Examiner*—Brent A. Swarthout
(74) *Attorney, Agent, or Firm*—Withrow & Terranova, PLLC

(57) ABSTRACT

The present invention provides for delivering content, such as information, advertisements, directions, and news, to a mobile terminal based on location. The mobile terminal is configured to determine its location and whether content is available based on internal records. If content is available, the mobile terminal may initiate correspondence with an application server to obtain the content. The mobile terminal may keep a table identifying the availability of content for defined locations. Preferably, the locations relate to cells within a wireless network wherein the mobile terminal will check for the availability of content for a given cell and request the content. The mobile terminal may check for the availability of content periodically or when the servicing cell changes.

28 Claims, 6 Drawing Sheets

U.S. PATENT DOCUMENTS

| | | | |
|---|---|---|---|
| 6,314,365 B1 | 11/2001 | Smith | 701/200 |
| 6,317,605 B1 | 11/2001 | Sakuma | 455/457 |
| 6,349,203 B1 | 2/2002 | Asaoka et al. | 455/414 |
| 6,353,398 B1 | 3/2002 | Amin et al. | 340/995 |
| 6,381,465 B1 | 4/2002 | Chern et al. | 455/466 |
| 6,452,498 B2 | 9/2002 | Stewart | 340/573.1 |
| 6,560,456 B1 | 5/2003 | Lohtia et al. | 455/445 |
| 6,587,759 B2 | 7/2003 | Obradovich et al. | 701/1 |
| 6,741,188 B1 * | 5/2004 | Miller et al. | 340/995.1 |
| 6,785,551 B1 * | 8/2004 | Richard | 455/456.1 |
| 6,925,603 B1 | 8/2005 | Naito et al. | 715/733 |

FOREIGN PATENT DOCUMENTS

| | | |
|---|---|---|
| EP | 0874529 A2 | 10/1998 |
| EP | 0896460 A2 | 2/1999 |
| EP | 1 130 933 A1 | 9/2001 |
| JP | 09-288684 | 11/1997 |
| JP | 11-282863 | 10/1999 |
| JP | 2001-92878 | 4/2001 |
| JP | 2001-217789 | 8/2001 |
| WO | WO 97/41654 | 11/1997 |
| WO | WO 99/04582 | 1/1999 |
| WO | WO 00/22860 | 4/2000 |
| WO | WO 00/79811 A1 | 12/2000 |

OTHER PUBLICATIONS

Johnson et al., "Ericsson's WebOnAir Information Server," On—Ericcson Review, Stockholm, SE, vol. 77, No. 4, pp. 264-274, XP000969934.

Mihovska, Albena, and Pereira, Jorge M., "Location-Based VAS: Killer Applications for the Next-Generation Mobile Internet," 12th IEEE International Symposium on Personal, Indoor and Mobile Radio Communications, PIMRC 2001 Proceedings (Cat. No. 01TG8598), Piscataway, NJ, pp. B-50-54, vol. 1, XP002216917.

European Search Report issued Nov. 12, 2003 for European patent application 02252432.6.

* cited by examiner

LOCATION-BASED CONTENT DELIVERY

The following application is a continuation of U.S. patent application Ser. No. 09/898,300, filed Jul. 3, 2001, now U.S. Pat. No. 6,798,358.

FIELD OF THE INVENTION

The present invention relates to delivering content to a mobile terminal, and in particular, to delivering content based on location in an efficient manner.

BACKGROUND OF THE INVENTION

Mobile terminals, such as mobile telephones and wireless personal digital assistants (PDAs), are now capable of receiving content from various types of network devices and presenting the content to users in a visual or audible format. Users of these devices may browse the Internet and receive various types of content. Further, mobile terminals may cooperate with various network services to receive alerts relating to any type of event or information.

Advertisers and other entities are trying to take advantage of this communication medium by sending users information via their mobile terminals. Users are interested in obtaining this information, but are primarily interested in obtaining information that is deemed beneficial. Information services have emerged that provide information based on the user's location in order to target such information to those most likely to benefit.

Many of the services providing information make defining and determining localities to associate with information difficult. People typically prefer to identify a locality based on common names and terminology, such as the name of an area, city, district, zip code, or the like. Existing location-based systems do not provide a user-friendly way to readily identify or associate known localities.

Existing techniques for providing alerts and related information to a user's mobile terminal based on location are network centric. The task of continuously tracking the user via the mobile terminal is placed squarely on services in the wireless communication network. Typically, the network must continuously poll the mobile terminal to determine location information and take action when location criteria are met. Having to continuously poll large numbers of mobile terminals creates a tremendous load on the wireless communication network.

Accordingly, there is a need for a technique to provide location-based information to mobile terminals in an efficient and user-friendly manner. There is also a need to minimize the impact on the wireless communication network. There is a further need to provide an effective way to manage the information provided via the mobile terminal and associate the information with readily recognized locations.

SUMMARY OF THE INVENTION

The present invention provides for delivering content, such as information, advertisements, directions, and news, to a mobile terminal based on location. The mobile terminal is configured to determine its location and whether content is available based on internal records. If content is available, the mobile terminal may initiate correspondence with an application server to obtain the content. The mobile terminal may keep a table identifying the availability of content for defined locations. Preferably, the locations relate to cells within a wireless network wherein the mobile terminal will check for the availability of content for a given cell and request the content. The mobile terminal may check for the availability of content periodically or when the servicing cell changes.

Each cell may represent a locality corresponding to a single cell, group of cells, or sectors within a cell. The locality is preferably a recognizable area, which is easily identified by a typical user. In order to minimize the impact on memory, the mobile terminal will preferably keep a relatively small table of locations and indicators of available content. When the mobile terminal moves to new locations or is serviced by an unknown cell, the mobile terminal may request an update for a given cell or the entire table.

Further, the application server may access a profile to select content to provide the mobile terminal based on user preferences, preferences of a service provider, or a combination thereof. Additionally, the application server may access more precise location information for the terminal from other location services tracking the mobile terminal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention uses a mobile terminal to help keep track of location information and the availability of information to download to the mobile terminal for defined locations. The mobile terminal will keep track of a small list of cells corresponding to a certain locality. Each cell or groups thereof may be associated with information to download to the mobile terminal when the mobile terminal is located in or enters into the defined cell or group of cells. The mobile terminal can detect when it enters a cell or group of cells, and identify if information is available for download because the mobile terminal is within a particular cell or group of cells. If content is available, the mobile terminal may signal an application server to effect delivery of the requested information to the mobile terminal. Additional detail is provided below.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
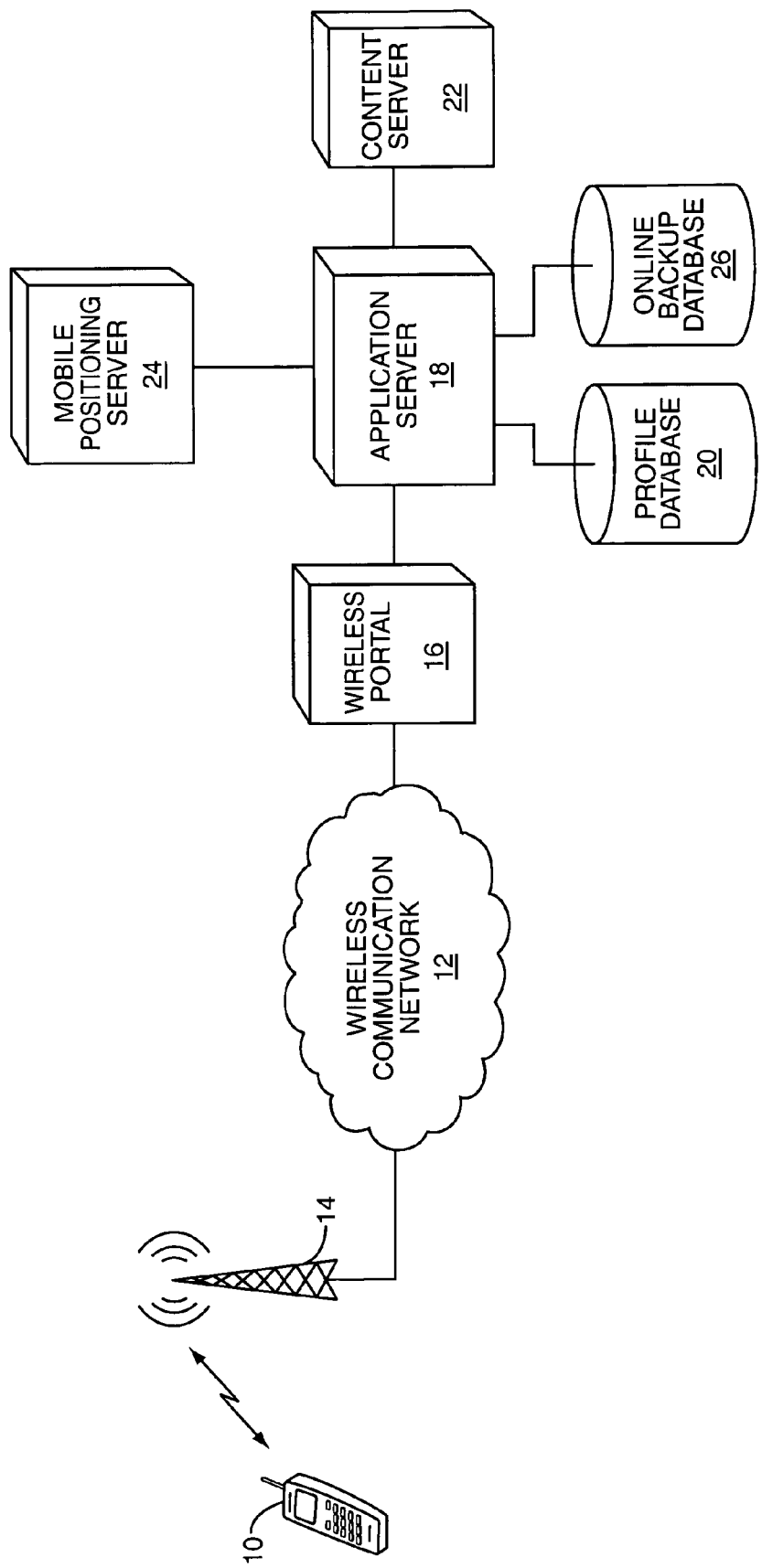
FIG. 1 is a block representation of a communication environment according to one embodiment of the present invention.

A representative communication environment for implementing the present invention is illustrated in FIG. 1. A mobile terminal 10, such as a mobile telephone or personal digital assistant (PDA), is serviced by a wireless communication network 12 via a proximate base station 14. The wireless communication network 12 will incorporate numerous base stations 14 to facilitate continuous coverage of an area for communications. Each base station 14 will typically provide communications within a given area, often referred to as a cell.

While moving, a mobile terminal 10 will travel from one cell to another, wherein the associated base station 14 for a cell in which the mobile terminal 10 is leaving will transfer control of the communication service to the base station 14 of the cell that the mobile terminal 10 is entering. Those skilled in the art will recognize the process of handing off communication from one base station 14 to another, and the various techniques within the numerous cellular communication standards whereby a mobile terminal 10 can identify a base station 14 with which to communicate. Most cellular communication standards provide signaling to the mobile terminal 10 identifying the servicing base station 14, and often, the base stations 14 supporting adjacent cells.

The wireless communication network 12 supports communications with a variety of other networks, including the public switched telephone network (PSTN) and packet-switched networks, such as the Internet. Typically, the circuit-switched communications supported by the wireless communication network 12 as well as the PSTN interface with a packet-switched network through a gateway, or like portal, such as a wireless portal 16. Further, the wireless communication network 12 may incorporate packet-switched networks and communications to support call signaling and other types of data transfer. Again, these basic communication concepts for supporting communications between and among various networks should be appreciated by those skilled in the art.

With regard to the present invention, there is a need to support communications between the mobile terminal 10 and various devices supported in the packet-switched network. In one embodiment, the mobile terminal 10 is configured to cooperate with an application server 18 to request and receive information, such as alerts and content, from any number of services or databases configured to cooperate with the application server 18.

To customize services provided for the mobile terminal 10, a user may access the application server 18 using a traditional personal computer or the like to establish a profile defining types of information to deliver to the mobile terminal 10 upon entering or being in defined locations. These defined locations may correlate to customary areas, or localities, that are recognizable to the public at large. For example, defined areas may represent a town, an area within a city, a zip code, or a famous landmark. These locations may be assigned to corresponding cells or a group of cells. For the purposes of this disclosure and the claims that follow, the terms "cell" and "group of cells" are referred to as a cell. As such, a cell may include multiple cells and sectors within a cell. Thus, a profile database 20 associated with or accessible by the application server 18 may be used to store a profile for a mobile terminal 10 defining a location and content to provide when the mobile terminal 10 enters or is at the given location.

A content server 22 may provide various types of content for delivery to the mobile terminal 10. The content may range from advertisements to directions and information about a specific location. Preferably, the content provided by the content server 22 will relate to a location associated with a given cell.

A mobile positioning server 24 or like positioning equipment represents a service capable of fine-tuning the position of a mobile terminal 10 within a given cell. Depending on geography and population density, cells may vary in diameter from 50 meters to several miles. In larger cells, it may be desirable to approximate the mobile terminal's actual position within a cell and use the approximated position to further refine the content to deliver to the user via the mobile terminal 10. The mobile positioning server 24 may be mobile positioning equipment, such as Nortel Networks Limited's e-Mobility Location Center, which is capable of determining the location of the mobile terminal 10 within a particular cell. Additional information on the architecture and operation of the e-Mobility Location Center is available through Nortel Networks Limited, 380 St. Antoine Street West, World Trade Center of Montreal, Montreal, Quebec H2Y 3Y4.

The mobile positioning server 24 may also access global positioning system (GPS) coordinates for the mobile terminal 10, assuming that the mobile terminal 10 is equipped to determine and provide GPS coordinates in a manner accessible by the mobile positioning serer 24. The wireless communication network 12 may also include equipment capable of providing enhanced observed time differentiation (E-OTD), which is capable of monitoring signals received from one or more cells to estimate the mobile terminal's location. Those skilled in the art will recognize the available systems and techniques for approximating the mobile terminal's actual position.

For select embodiments of the present invention, the application server 18 may access such location information to determine whether content is available or the type of content to provide to the mobile terminal 10. Thus, the mobile positioning server 24 may be used in select embodiments to fine-tune position information. An online backup database 26 or like backup service may be provided to store content that was or could be delivered to the mobile terminal 10.

Figure 2:
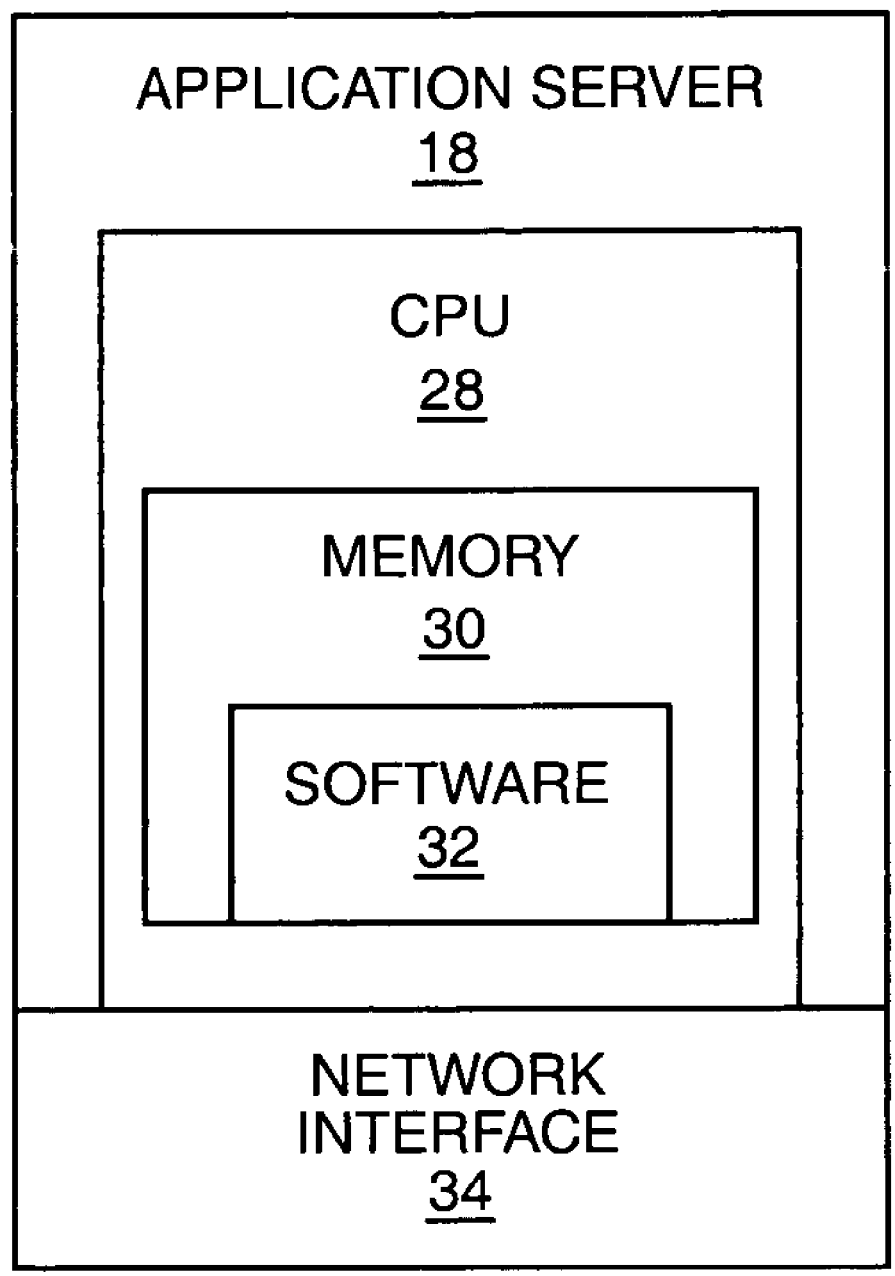
FIG. 2 is a block representation of a application server constructed according to a preferred embodiment of the present invention.

As shown in FIG. 2, the application server 18 may be a typical web server having a central processing unit (CPU) 28 with the requisite memory 30 containing the software 32 and data necessary for operation. The CPU 28 is associated with a network interface 34 facilitating communications with other devices, such as the wireless portal 16, mobile positioning server 24, content server 22, online backup database 26, and profile database 20, on a packet-switched network through any number of local area networks, routers, switches and hubs in traditional fashion.

Figure 3:
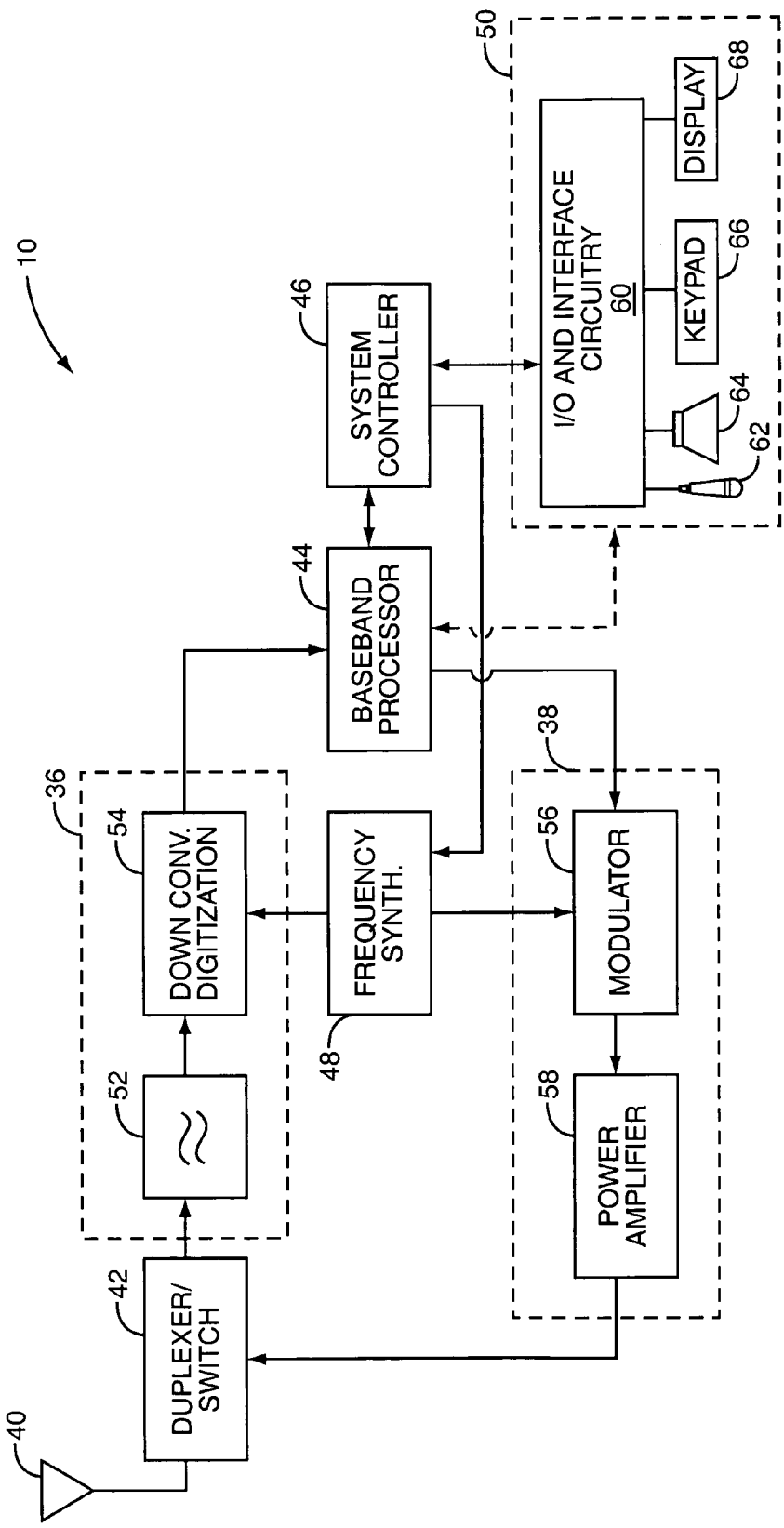
FIG. 3 is a block representation of a mobile terminal constructed according to a preferred embodiment of the present invention.

The mobile terminal 10 of the present invention helps reduce the load on the wireless communication network 12 by monitoring its location and determining if content is available. Thus, the need to continuously track the mobile terminal 10 and identify the availability of content is removed from the many tasks of the wireless communication network 12. Although the mobile terminal 10 may take on many configurations, an exemplary mobile terminal 10 is represented in FIG. 3.

The mobile terminal 10 may include a receiver front end 36, a radio frequency transmitter section 38, an antenna 40, a duplexer or switch 42, a baseband processor 44, a system controller 46, a frequency synthesizer 48, and an interface 50. The receiver front end 36 receives information bearing radio frequency signals from one or more remote transmitters provided by the base station 14. A filter circuit 52 minimizes broadband interference in the received signal, while a downconverter 54 downconverts the filtered, received signal to an intermediate or baseband frequency signal, which is then digitized into one or more digital streams. The receiver front end 36 typically uses one or more mixing frequencies generated by the frequency synthesizer 48.

The baseband processor 44 processes the digitized received signal to extract the information or data bits conveyed in the received signal. This processing typically comprises demodulation, decoding, and error correction operations. As such, the baseband processor 44 is generally implemented in one or more digital signal processors (DSPs).

On the transmit side, the baseband processor 44 receives digitized data from the system controller 46, which it encodes for transmission. The encoded data is output to the transmitter 38, where it is used by a modulator 56 to modulate a carrier signal that is at a desired transmit frequency. A power amplifier 58 amplifies the modulated carrier signal to a level appropriate for transmission from the antenna 40.

A user may interact with the mobile terminal 10 via the interface 50, which may include input/output (I/O) and interface circuitry 60 associated with a microphone 62, a speaker 64, a keypad 66, and a display 68. The I/O and interface circuitry 60 typically includes analog-to-digital converters, digital-to-analog converters, amplifiers, and the like. Additionally, it may include a voice encoder/decoder, in which case it may communicate directly with the baseband processor 44.

The microphone 62 will typically convert audio input, such as the user's voice, into an electrical signal, which is then digitized and passed directly or indirectly to the baseband processor 44. Audio information encoded in the received signal is recovered by the baseband processor 44, and converted into an analog signal suitable for driving speaker 64 by the I/O and interface circuitry 60. The keypad 66 and display 68 enable the user to interact with the mobile terminal 10, input numbers to be dialed, address book information, or the like, as well as monitor call progress information.

Particularly useful for the present invention, the display 68 may be used for more data-intensive applications, such as providing messages and information using the short messaging service (SMS), paging, email, and the like. Messages may be sent to the mobile terminal 10 to indicate that content is available for viewing, describe available content, or provide any information related to accessing, providing, and displaying content according to the present invention.

In one embodiment, the display 68 and keypad 66 cooperate to provide soft-key functions wherein icons displayed on the display 68 are presented to the user and selected upon pressing an associated key. The icons may represent available content and trigger display of the content when pressed. Additionally, icons may be provided to give the user options to request, view, ignore, and save content as will be discussed below in greater detail.

As noted, the mobile terminal 10 is configured to associate content or the availability of content with certain cells of the wireless communication network 12. Preferably, the system controller 46 in the mobile terminal 10 maintains a table for a number of cells and associated content indicia. The content indicia may simply be a flag indicating the availability of content as well as an address for content, or may consist of actual content.

A process running on the system controller 46, referred to herein as a device resident program (DRP), may be configured to access other processes running on the system controller 46 to identify the cell currently serving the mobile terminal 10. The DRP may also identify changes in servicing cells. Depending on the configuration, the DRP may identify a servicing cell or a change in servicing cells, and will then use the table to determine if content is associated with the cell. Notably, the DRP may identify a cell using identification for the servicing base station 14 or the like.

In one embodiment of the present invention, cells are associated with and used to define a commonly recognized locality. By defining localities with cells, users and content providers can more effectively identify or associate commonly represented localities without having to understand cell layout and identification.

Figure 4A:
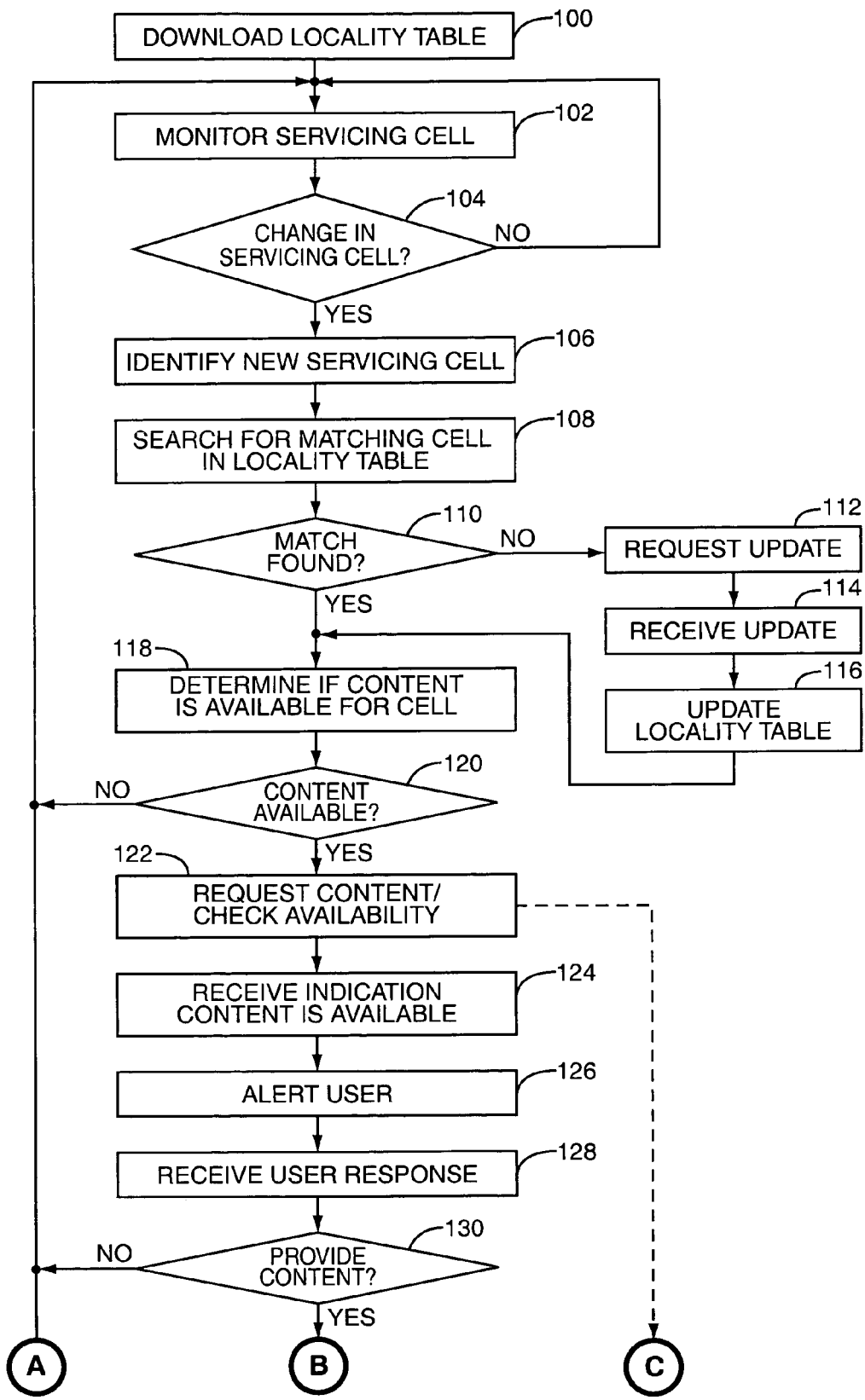
FIGS. 4A and 4B are a flow diagram outlining an exemplary process for operating a mobile terminal according to one embodiment of the present invention.
Figure 4B:
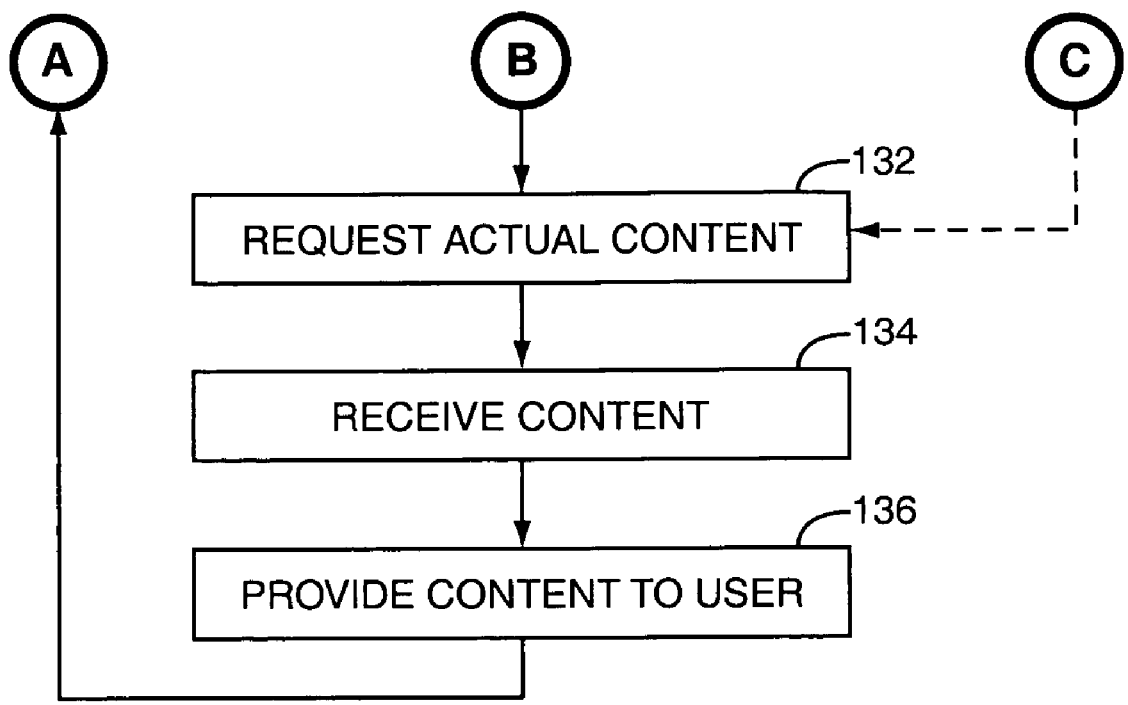

The table associating cells and available content may be updated based on the location of the mobile terminal 10 to avoid having the mobile terminal 10 keep track of all available cells and whether or not content is available for the cells. The number of cells or localities represented in the table will vary depending on available memory and the desired processing speed. For the purposes of description, the table associating cells and available content is referred to as a locality table. An exemplary flow outlining operation of the system controller 46 in association with or under the control of the DRP is provided in FIGS. 4A and 4B.

Initially, a locality table is downloaded to the mobile terminal 10 (step 100), wherein the system controller 46 under the control of the DRP will monitor processes of the system controller 46 identifying the servicing cell (step 102). The DRP looks for a change in the servicing cells (step 104). If there is no cell change, the DRP continues to monitor the servicing cell (step 102).

When there is a change in the servicing cell (step 104), the new cell is identified (step 106), and the locality table is searched to see if the new servicing cell appears in the table (step 108). If no match is found (step 110), the system controller will request an update for the locality table, typically from the application server 18 (step 112). The update will be received (step 114), and the DRP will update the locality table (step 116).

Assuming that a match is found, initially or after an update (step 110), the DRP will determine if content is available for the cell (step 118). In one embodiment, the determination of whether content is available is made by going to a position in the table for the servicing cell and seeing if there is associated content available. The indication of content being available may simply be the existence of a flag. Alternatively, the table may include select content or an address for the content.

If the table indicates that there is no content available for the servicing cell (step 120), the DRP will resume monitoring for a change in cells and repeat the above process. If content is available (step 120), the DRP may determine content is actually available via the application server 18 (step 122). Although the locality table may indicate that content is available, the actual availability of the content may have changed since the locality table was updated, or there may be problems on the network preventing access to the content.

As such, a request may be sent to the application server 18 to check the availability of the content (step 122). In return, the mobile terminal 10 will receive indication that content is available (step 124), and the DRP may alert the user of the mobile terminal 10 accordingly by providing audible or display indicia to the user (step 126). In response, the user may provide an indication of whether or not the content should be provided to the user (step 128).

If the user declines to receive the content (step 130), the DRP will return to monitoring for a change in the servicing cell. If the user elects to receive the content (step 130), the DRP will control the system controller to request the actual content via the application server 18 or from the content server 22 directly (step 132). In response, the mobile terminal 10 will receive the content (step 134) and the DRP will direct the system controller 46 to provide the content to the user in a specified fashion (step 136). Upon receiving the content, the user may simply review and discard the information, or the information may include additional links starting a iterative process of requesting and receiving additional information as desired by the user and directed by the content.

Figure 5:
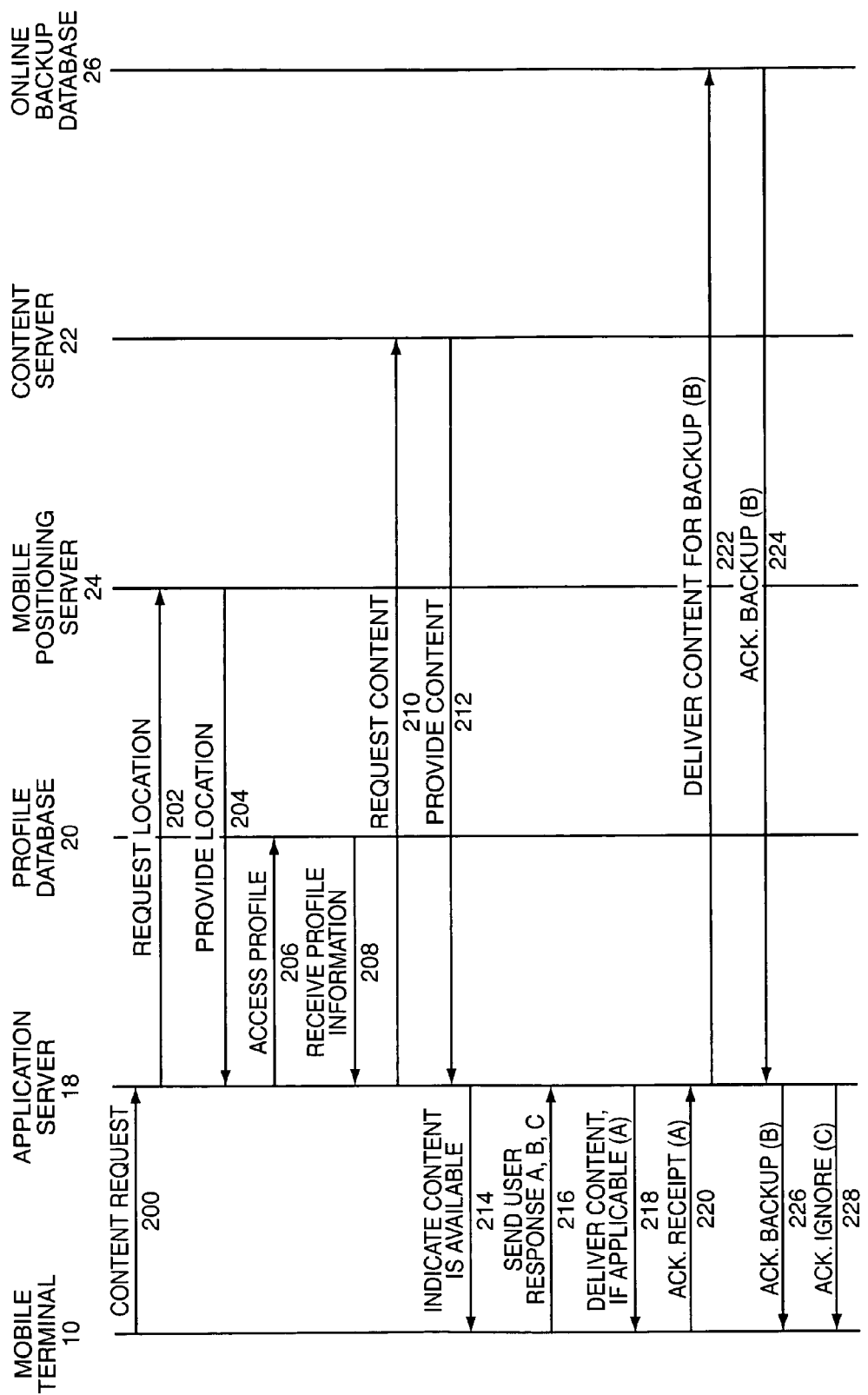
FIG. 5 is a communication flow diagram representing an exemplary operation according to one embodiment of the present invention.

An overall communication flow diagram for an exemplary embodiment of the present invention is illustrated in FIG. 5. When a mobile terminal 10 requests content or checks for the availability of content, a content request is initiated. The content request is preferably a hypertext transfer protocol (HTTP) request, and is intended to be routed to the application server 18 to initiate the execution of a content delivery service (step 200). As noted above, the application server 18, if so configured, may take any information sent with the content request, such as identification indicia of the mobile terminal 10 and the servicing cell, and send a request for additional location information to the mobile positioning server 24 (step 202).

The mobile positioning server 24 represents any type of location determining system or service associated with the wireless communication network 12 or other positioning systems capable of identifying a location of the mobile terminal 10. Preferably, the location information is used to fine-tune the position of the mobile terminal 10 or otherwise determine the position of the mobile terminal 10 within a given cell. The location request is preferably an extensible markup language (XML) message, but those skilled in the art will recognize that the message may take many forms.

In response to the location request, the mobile positioning server 24 will provide additional location information to the application server 18 (step 204). The application server 18 will use the servicing cell and additional location information, if available, to access a profile in the profile database 20 to determine if content is available based on the location and/or identified mobile terminal 10 (step 206). The application server 18 will receive the profile information (step 208), and request any available content from the content server 22 (step 210). Assuming that content is available, the content server 22 will provide the requested content to the application server 18 (step 212), which may send information to the mobile terminal 10 indicating that content is available (step 214). In response, the mobile terminal 10 will query the user of the mobile terminal 10 to determine whether they would like to receive the content immediately (A), store the content for later viewing (B), or ignore the content (C). The mobile terminal 10 will send information pertaining to the user response to the application server 18 (step 216), which will react accordingly.

If the user elected to immediately receive the content (A), the application server 18 will deliver the content to the mobile terminal 10 (step 218). The mobile terminal 10 will preferably acknowledge receipt of the content by sending a corresponding acknowledgement (ACK) to the application server 18 (step 220).

If the user elected to store the content for future retrieval (B), the application server 18 may deliver the content to the online backup database 26 for storage (step 222). Preferably, the online backup database 26 will respond with an acknowledgement to the application server 18 (step 224). The application server 18 may then send an acknowledgement of the backup to mobile terminal 10 for future reference (step 226).

If the user elected to ignore the content (C), the application server 18 will take no further action beyond acknowledging receipt of the response to the mobile terminal 10 (step 228).

Those skilled in the art will appreciate the scope and flexibility of the present invention. The inventive concepts provide for efficient tracking of mobile terminals 10 in order to deliver select location-specific content to mobile terminals 10. The delivery of content may be controlled by one or more profiles, which may be set up by the mobile terminal user or information providers. To determine whether content is available, multiple profiles may be checked to make sure that a user actually desires select information. For example, an information provider may have numerous types of information available for a given location, whereas a user profile may be used to filter the information to provide only the information that is available and is desired by the user.

The application server 18 may support services wherein users and information providers may define profiles based on localities, wherein locations are associated with cells or positions therein in the background. Thus, an information service provider or user may want to provide or receive, respectively, information when a user is in Chinatown, Little Italy, or the Waterfront, all within a select city. In these cases, localities are based on real world locations and areas, and the system architecture can determine which cells, groups of cells, sectors within cells, or the like correspond to those areas.

The content provided or otherwise pushed to the mobile terminal 10 may include advertisements, traffic advisories, weather advisories, maps, directions, historical information, and the like to a user when they are in a location that would make the information relevant. In essence, a mobile terminal 10 may download a relatively manageable list of cells for a particular locality and compare its current location to the list. If the current location is deemed to contain information, the mobile terminal 10 may query the application server 18 via a short message service (SMS), wireless application protocol (WAP)/HTTP browser, or other in-band communication function, to provide such information. Alternatively, the user may be notified that content is available and determine whether or not to receive the information.

Typically, the mobile terminal 10 will include a table defining multiple, contiguous areas, wherein the mobile terminal 10 will determine the change from one area to another and access or otherwise alert the user that such information is available. For example, if an overall table relates to a town, city, or zip code, cell groupings within the table may represent business districts, shopping districts, and tourist districts. The tables may be updated as the mobile terminal 10 is moved outside of a coverage area.

The areas defined by cells may be broken into smaller areas if additional positioning information is obtainable. Further, the triggering event to determine if content is available may take many forms in addition to simply triggering upon entering a new area, such as when a servicing cell is changed. The mobile terminal 10 may be configured to periodically check for information while within a given cell or area definition. Those skilled in the art will recognize numerous techniques to provide additional triggers and control content that are within the teachings provided herein.

Those skilled in the art will recognize improvements and modifications to the preferred embodiments of the present invention. All such improvements and modifications are considered within the scope of the concepts disclosed herein and the claims that follow.

What is claimed is:

1. A mobile terminal facilitating delivery of content to a user comprising:
    communication electronics supporting communications with a wireless communication network; and
    a system controller associated with the communication electronics to:
    identify location indicia bearing on a location of the mobile terminal;
    determine if content is available for the location of the mobile terminal, the content comprises location-based information about places or entities within the location; and
    effect delivery of a message to a remote application service indicative of the mobile terminal being in the location where the content is available for delivery to the mobile terminal, responsive to determination that content is available for a given location.

2. The mobile terminal of claim 1 wherein the system controller is adapted to identify the location indicia by identifying a cell servicing the mobile terminal.

3. The mobile terminal of claim 2 wherein certain of the cells correspond to a generally recognizable locality.

4. The mobile terminal of claim 1 wherein the system controller provides a table associating a plurality of locations with content availability indicia indicating if content is available for the plurality of locations and the system controller is further adapted to determine if the content is available using the table.

5. The mobile terminal of claim 3 wherein the system controller is further adapted to effect an update request when an unknown cell is serving the mobile terminal and receive an update indicating the availability of content for the unknown cell.

6. The mobile terminal of claim 4 wherein the system controller is further adapted to effect a request for a new or updated table upon entering a new location.

7. The mobile terminal of claim 2 wherein a corresponding base station identifies the cell.

8. The mobile terminal of claim 2 wherein the cell is at least one of a group consisting of one cell, a group of cells, and at least one sector within the cell.

9. The mobile terminal of claim 1 wherein the system controller is further adapted to alert the user of the mobile terminal once the content is determined to be available and receive a response from the user indicating how to proceed.

10. The mobile terminal of claim 1 wherein the system controller includes a device resident program adapted to identify the location indicia bearing on the location of the mobile terminal and determine if the content is available for the location of the mobile terminal.

11. A method for providing content to a mobile terminal based on location comprising:
    receiving a message from the mobile terminal responsive to the mobile terminal determining that the content is available for a given location;
    accessing the content associated with the given location; and
    delivering the content to the mobile terminal, the content comprises location-based information about places or entities within the given location.

12. The method of claim 11 further comprising obtaining location information for the mobile terminal from a positioning service and wherein accessing is based on the location information obtained from the positioning service.

13. The method of claim 11 further comprising accessing a profile defining the content to provide to the mobile terminal.

14. The method of claim 11 further comprising:
    determining if the content is actually available;
    delivering information to the mobile terminal indicating that the content associated with the given location is available; and
    receiving a response from the mobile terminal to deliver the content to the mobile terminal prior to delivering the content to the mobile terminal.

15. The method of claim 11 wherein the message from the mobile terminal identities a cell or base station servicing the mobile terminal.

16. The method of claim 15 wherein the cell or base station correlates with a recognizable locality.

17. A computer readable medium comprising software for instructing a computer to:
    receive a message from a mobile terminal responsive to the mobile terminal determining that content is available for a given location;
    access the content associated with the given location; and
    deliver the content to the mobile terminal, wherein the content comprises location-based information about places or entities within the given location.

18. The computer readable medium of claim 17 further comprising instructions to obtain location information for the mobile terminal from a positioning service and wherein the content that is accessed is based on the location information obtained from the positioning service.

19. The computer readable medium of claim 17 further comprising instructions to access a profile defining the content to provide to the mobile terminal.

20. The computer readable medium of claim 17 further comprising instructions to:
    determine if the content is actually available;
    deliver information to the mobile terminal indicating that the content associated with the given location is available; and
    receive a response from the mobile terminal to deliver the content to the mobile terminal prior to delivering the content to the mobile terminal.

21. The computer readable medium of claim 17 wherein the message from the mobile terminal identifies a cell or base station servicing the mobile terminal.

22. The computer readable medium of claim 21 wherein the cell or base station correlates with a recognizable locality.

23. A system for providing content to a mobile terminal based on location comprising:
- means for receiving a message from the mobile terminal responsive to the mobile terminal determining that the content is available for a given location;
- mean for accessing the content associated with the given location; and
- means for delivering the content to the mobile terminal, the content comprises location-based information about places or entities within the given location.

24. The system of claim 23 further comprising means for obtaining location information for the mobile terminal from a positioning service and wherein the means for accessing is based on the location information obtained from the positioning service.

25. The system of claim 23 further comprising means for accessing a profile defining the content to provide to the mobile terminal.

26. The system of claim 23 further comprising:
- means for determining if the content is actually available;
- means for delivering information to the mobile terminal indicating that content associated with the given location is available; and
- mean for receiving a response from the mobile terminal to deliver the content to the mobile terminal prior to delivering the content to the mobile terminal.

27. The system of claim 23 wherein the message from the mobile terminal identifies a cell or base station servicing the mobile terminal.

28. The system of claim 24 wherein the cell or base station correlates with a recognizable locality.

* * * * *